Jan. 8, 1957 B. L. BINFORD 2,777,045
TANK CONTROL
Filed May 9, 1955
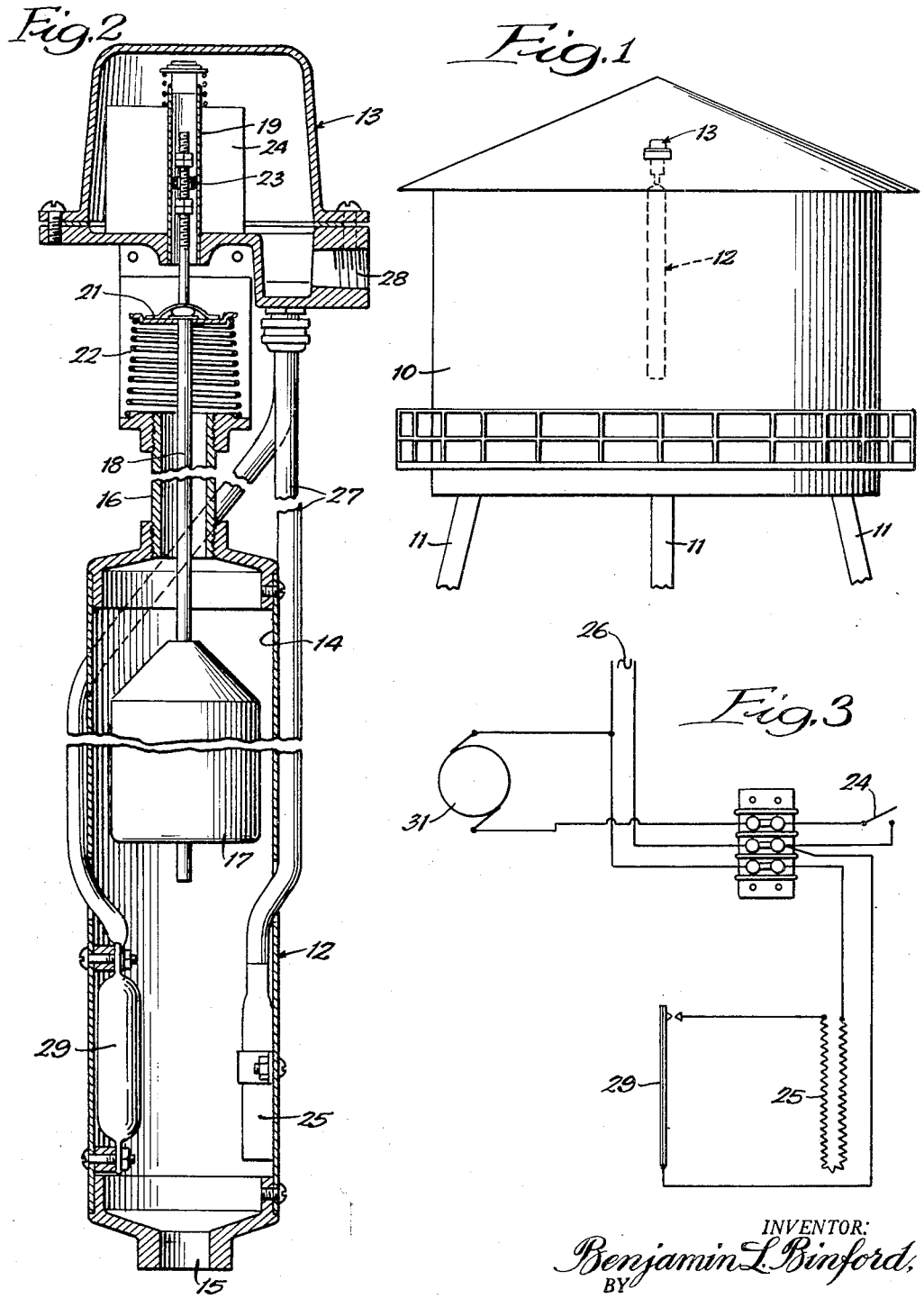
INVENTOR:
Benjamin L. Binford,
BY
Bair Freeman & Molinare
ATTORNEYS.

United States Patent Office 2,777,045
Patented Jan. 8, 1957

2,777,045

TANK CONTROL

Benjamin L. Binford, Chicago, Ill., assignor to Magnetrol Inc., Chicago, Ill., a corporation of Illinois Application May 9, 1955, Serial No. 506,744

3 Claims. (Cl. 219—38)

This invention relates to tank controls and more particularly to a control apparatus for use with exposed water tanks and the like.

It is common practice to mount water tanks on roofs or separate frameworks to provide a constant source of water under pressure for sprinklers and the like. Such tanks are normally provided with a level control to turn on the pump or other water supply when the level of the water therein reaches a predetermined low value and to turn off the water supply when the level in the tank reaches a predetermined high value.

In cold weather, the water in such tanks may freeze around the control elements at the water surface sufficiently to prevent operation of the controls. It will be apparent that water may be withdrawn from below a layer of ice at the water surface while the control itself would be held by the ice to continue to indicate a full tank when in fact the tank is empty. This condition can lead to very serious failures of sprinkling systems, or the like.

It is therefore one of the objects of the present invention to provide a tank control in which interference with operation by freezing of liquid in the tank is prevented.

Another object is to provide a tank control in which the control elements are isolated from the major body of liquid in the tank and are prevented from freezing by an automatic control heater.

The above and other objects and features of the invention will be more readily apparent from the following description when read in connection with the accompanying drawing, in which:

Figure 1 is a view illustrating installation of the control of the present invention on a tank;

Figure 2 is an enlarged sectional view through the control; and

Figure 3 is a wiring diagram.

The control of the present invention may be installed in a tank of the type illustrated at 10 which is supported on legs 11 on the roof of a building or on a separate elevated framework. The tank is normally maintained substantially full of water in response to an automatic control indicated generally at 12, including a control head 13 mounted above or on top of the tank to turn on the water supply when the level falls and to shut off the water supply when the level is at a desired value.

The level of water in the tank is adapted to be controlled in accordance with the present invention regardless of freezing of the water in a relatively thick or thin layer at the water surface. In conventional controls utilizing floats or displacers, the float or displacer will be held by a relatively thin layer of ice so that under freezing conditions, the control fails to function and serious damage may result.

According to the present invention, the control itself comprises an elongated tube 14 adapted to project vertically into the tank and open at its bottom, as indicated at 15, to the water in the tank. The upper end of the tube is connected to a conduit extension 16 which opens above the normal maximum level of liquid in the tank so that the level of liquid in the tube will always follow the liquid level in the tank itself.

The tube is adapted to contain a float mechanism, shown at 17, which may be a single float or displacer to follow the liquid level in the tube or which may be a double float of the type more particularly disclosed and claimed in my Patent No. 2,564,655. In any case, the float is clear of the sides of the tube so that it will follow the liquid level within the tube.

The float is connected to a float rod 18 which extends upward through the tube and through the extension 16 into the head 13. The head includes a non-magnetic tube 19 projecting upward therein into which the float rod 18 extends. The float rod 18 may carry a plate 21 seating against the upper end of a spring 22 which serves to urge the float and its associated mechanism upward thereby to counterbalance the weight thereof.

At its upper end, the float rod 18 carries a magnetic armature 23 which will operate a magnetic switch indicated generally at 24 and which may be of the type disclosed in my patent referred to above.

In order to prevent the water within the tube 14 from freezing, in the event of low temperature conditions, an electric heater 25 is mounted within the tube 14 and preferably in the lower part thereof. The heater 25 is connected to a suitable source of supply, shown at 26 in Figure 3, through wires extending through a closed conduit 27 to an external connection 28 on the head. The source 26 may be connected to the heater 25 through a thermostatic bi-metal switch 29 mounted in the tube 14 and responsive to the temperature of the water therein. As will be apparent from the circuit diagram of Figure 3, the heater is controlled entirely independently of the switch 24 while the switch 24 may control a motor 31 to operate a pump for supplying additional water to the tank independently of the thermostatic switch and heater.

In use, when the temperature falls, so that there is danger of freezing the water within the tube 14, the thermostatic switch 29 will close to energize the heater 25. The heater 25 will supply sufficient heat to the water within the tube to prevent it from freezing without being required to heat all of the water in the tank. Experiments have shown that a relatively small capacity electric heater can function to prevent freezing in a tube, as shown, which is immersed in water in a tank even though the water in the tank may freeze. Therefore, the float is easily maintained free at all times to control the water supply so that the water level in the tank will be maintained at the desired value under all weather conditions.

While one embodiment of the invention has been shown and described in detail, it will be understood that this is illustrative only and is not to be taken as a definition of the scope of the invention, reference being had for this purpose to the appended claims.

What is claimed is:

1. A control apparatus for exposed water tanks and the like comprising an elongated vertical tube to be mounted in the tank and in open communication at its upper and lower ends with the tank to contain liquid at the same level as the tank, displacer means in the tube to move in response to changes in liquid level in the tube, control means at the upper end of the tube operatively connected to the displacer means to be operated in response to movement thereof, heating means in the tube, and control means for the heating means responsive to the temperature of liquid in the tube.

2. A control apparatus for exposed water tanks and the like comprising an elongated vertical tube to be mounted in the tank and in open communication at its upper and lower ends with the tank to contain liquid at the same level as the tank, displacer means in the tube to move in response to changes in liquid level in the tube, control means at the upper end of the tube operatively connected to the displacer means to be operated in response to movement thereof, an electric heater in the tube, and a thermostatic control in the tube to turn on the heater when the temperature of the liquid in the tube approaches freezing thereby to prevent freezing of liquid in the tube.

3. In combination with a water tank, a vertical tube mounted in the tank and terminating above the maximum level of water in the tank and in open communication with the tank at its upper and lower ends, displacer means in the tube to move in response to changes in the liquid level, control means at the upper end of the tube connected to the displacer means to be operated thereby, heating means in the tube, and control means for the heating means mounted in the tube and responsive to the temperature of the water therein.

References Cited in the file of this patent

UNITED STATES PATENTS

| | | |
|---|---|---|
| 1,202,976 | Derby | Oct. 31, 1916 |
| 1,731,506 | Simzer | Oct. 15, 1929 |
| 2,007,358 | Anger | July 9, 1935 |
| 2,666,126 | Raines | Jan. 12, 1954 |